United States Patent [19]

Elzind

[11] Patent Number: 5,585,704
[45] Date of Patent: Dec. 17, 1996

[54] COMPUTER MEANS FOR COMMERCIAL WASHING MACHINES

[76] Inventor: Adel H. Elzind, 26 Blakely Pl., Garfield, N.J. 07026

[21] Appl. No.: 187,914

[22] Filed: Jan. 28, 1994

[51] Int. Cl.⁶ .............................. C05B 11/01; H02H 7/08
[52] U.S. Cl. .......................... 318/446; 364/181; 364/146; 388/907.5
[58] Field of Search ..................................... 364/140, 146, 364/141, 147, 180, 181; 68/12.02, 12.04; 318/3–4, 446, 8, 37, 41, 10, 254; 388/907.5

[56] References Cited

U.S. PATENT DOCUMENTS

| | | | |
|---|---|---|---|
| 4,896,288 | 1/1990 | Gonnering et al. | 318/603 |
| 5,128,857 | 7/1992 | Okada et al. | 364/140 |
| 5,241,841 | 9/1993 | Ishibashi et al. | 68/12.04 |
| 5,265,004 | 11/1993 | Schultz et al. | 364/140 |
| 5,297,307 | 3/1994 | Baek | 68/12.02 |
| 5,345,379 | 9/1994 | Brous et al. | 364/146 |

*Primary Examiner*—John W. Cabeca

[57] ABSTRACT

An improvement is provided to upgrade preexisting commercial washing machines by incorporating microprocessor based controls. Elimination of unwieldy harnesses between manual operation controls and the washing machine controls provided as are improvements in control of the system by using memory cards. Further, the system includes means to detect, early on, power failure and to store and restore the commercial washing machine operation at the point at which it stopped.

9 Claims, 16 Drawing Sheets

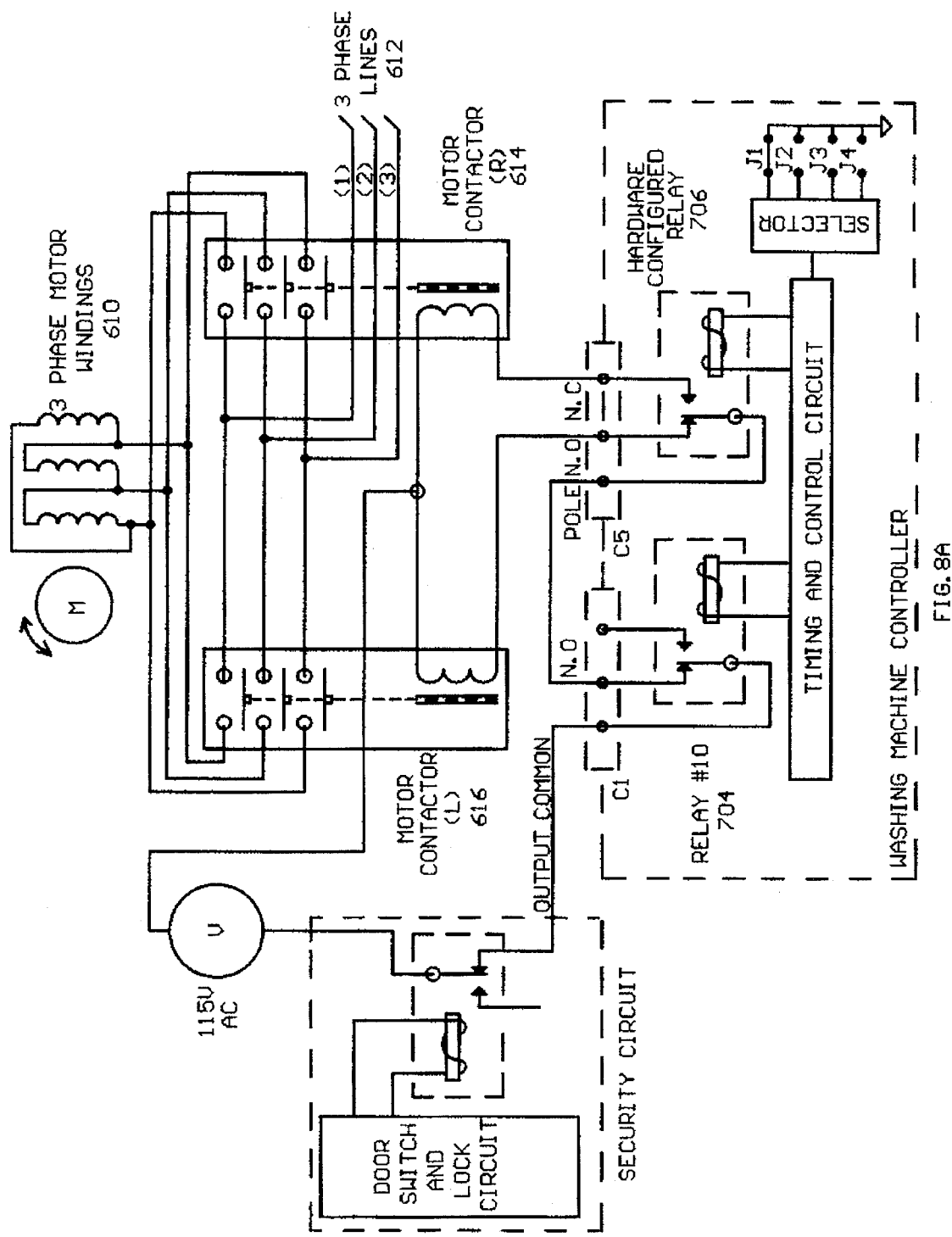

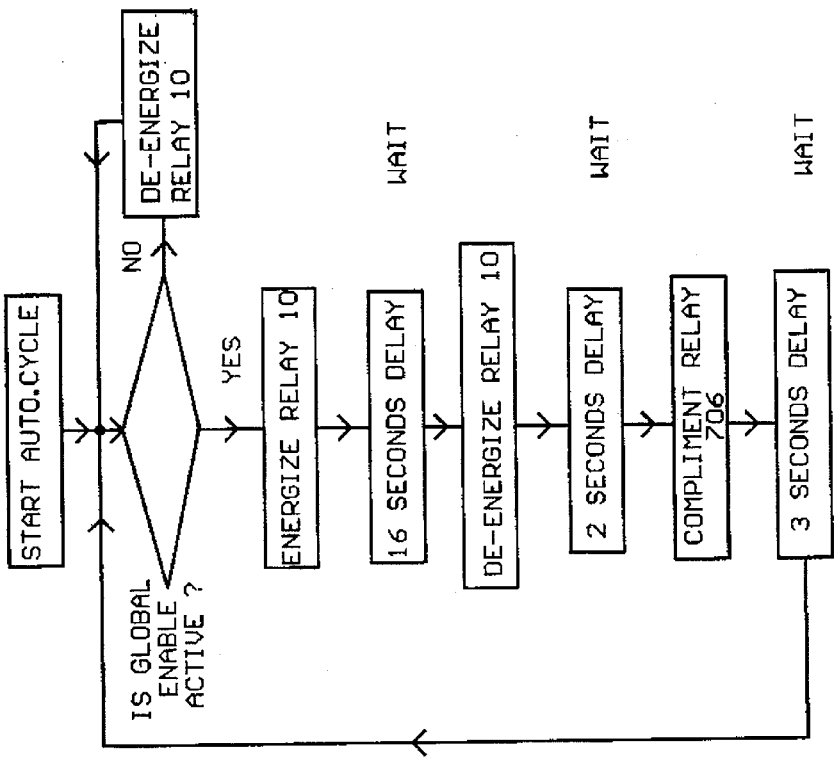
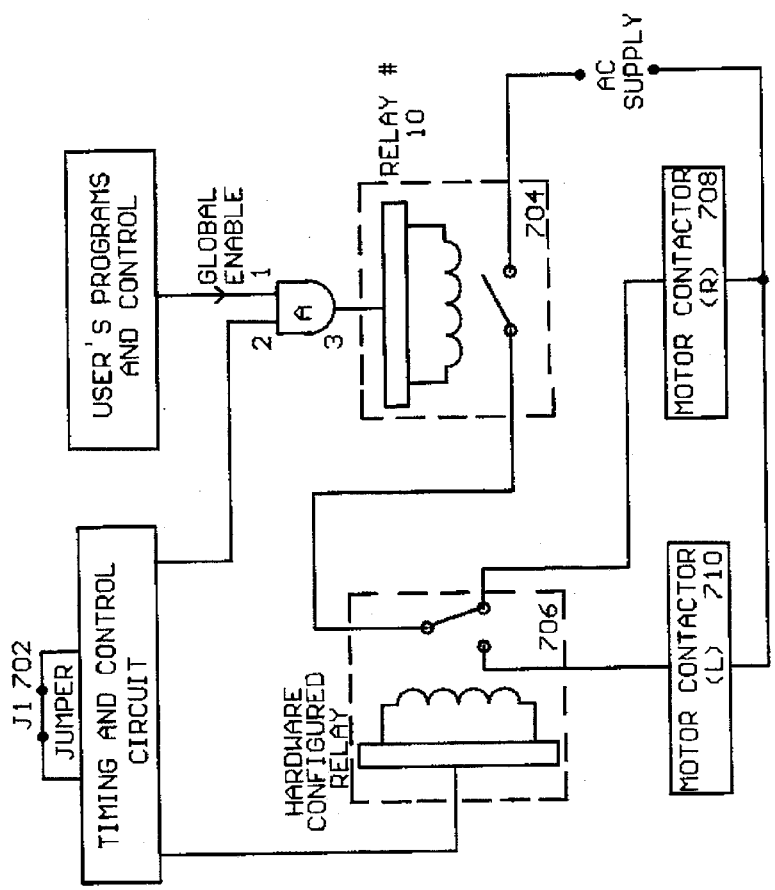
FIG. 9

COMPUTER MEANS FOR COMMERCIAL WASHING MACHINES

This invention relates to commercial washing machines, and more particularly, to improvements in such commercial machines making them more efficient in operation.

Commercial washing/dry cleaning machines have their origins and underlying designs in large scale old style mechanical timers and switches which operate motors, valves and various other components of commercial washing machines. More recent Original Equipment Manufacturers OEM equipment has incorporated advances in solid state switching, computer technology and other technological advances making new OEM machines more efficient.

There are a large number of preexisting older commercial washing machines which could operate more efficiently were more modern technology utilized. Thus, an object of this invention is to provide a system which can be utilized with currently installed commercial washing machines which takes advantage of improved technological advances and further enhances the efficiency of such pre-existing machines. Further, some of the newly suggested technological features may be incorporated in OEM equipment for commercial washing and dry cleaning machines.

Prior art commercial washing machines are operated automatically from a stored program or manually by pushing buttons. (See FIG. 1) The manner in which this is accomplished is that there is hardwiring connecting an interface module (MOD2) to the manual push buttons (MOD 1) and the high power switches (MOD3) that energize the various washing machine components.

The interface module with its pulse latch relays, time delay relays and those other relays wired in a manner to perform logical operations make it very costly to build and very hard to troubleshoot.

Such hard wiring is cumbersome, difficult, unwieldy and generally undesirable. Thus, another object of this invention is to provide a system in which manual push buttons used to manually operate a commercial washing machine are connected to a microprocessor based control system (MOD4) (FIG. 2) which itself then controls the operation of the various washing machine electric components so that only a few wires are required to be connected between the manual push buttons and the controller.

There have been some suggestions to improve the automatic controller (MOD 4) FIG. 1, but none of these deal with the existing manual operation push buttons and their unwieldy hardwiring and other material costs involved.

This invention teaches replacing the preexisting manual operation push buttons system with a manual operation push buttons module that is connected to an automatic controller that responds to the manual entries and itself controls operation of the washing machine thus reducing the present cost and labor currently required for the manual control functions in such machines. This renders the current system more user friendly in that the operator can more effectively run the washing machine either automatically or manually through the same automatic controller without the serious maintenance required in the prior art in which bulky and unwieldy hardwiring systems were used. Although the system is described as being used with prior art systems, it may be beneficial as OEM equipment.

Further, this invention teaches the use of a semi conductor memory card which is not required to operate the automatic wash operation but possesses unique qualities especially suitable for backing up multiple wash programs from one washing machine controller and load the programs into another washing machine controller.

With regard to the above-suggested improvements relating to interconnecting the manual push buttons to the controller of the commercial washing machine, reference is made to German Patent 40 01 279, a copy of which is submitted herewith. This patent discloses a washing machine control circuit which uses a central processor CPU 1 for operating the process parameters in association with a keyboard 3 in a non-programmable, non-transient set value storage, in which the process parameters are read or overwritten into or retrieved from an additional, freely programmable non-transient storage. In this regard, the circuit includes a ROM 4, an EAROM or $E^2PROM$ 5, and program controllers 2 and 5. This patent specifically states that set programs for washing and rinsing cycles can be carried out in a variety of ways without the need to alter the preset programs themselves.

Japanese patent publication No. 3-29696 discloses a washing machine having a magnetic card reader built into the operation panel. Different cards can be inserted therein to change the washing instructions.

Neither of these patents discloses teaches or suggests the problems that are encountered when attempting to upgrade existing commercial washing machines by adding the ability to run the machine either manually or automatically and eliminating the large cable harness connected directly from the manual push button switches to the interface module with another harness from the interface module to the high power switches that run the washing machine components. One aspect of the present invention is to eliminate such unwieldy wiring problems as well as the interface module with its attendant maintenance problems.

Another aspect of the present invention relates to the ability to ensure that if power is interrupted during the operation of the commercial washing machine, that the machine cycle commences its operation where it stopped during its cycle when power is restored. In this regard, reference is made to Japanese patent publication numbers 63-262187; 63-262188; 2-121695 and 2-121696 which all disclose washing machines having a microprocessor controller with a non-volatile memory for storing status information of the washing machine. In the case of a power failure, the status information of the machine is saved. Japanese patent publication 63-262187 discloses a circuit in which a power failure detection circuit is provided between a rectifier and a smoothing capacitor, and its output is supplied to a microprocessor. When there is a power failure, the memory circuit saves the most recent information, and when power is restored, the memory circuit reloads the saved information back to the CPU for recommencement of operation at the point where power was lost. Japanese patent publication No. 63-262188 discloses storing information concerning the water level in a machine when it is unexpectedly stopped. Japanese patent publication No. 2-121696 discloses that the washing process conditions are written into backup memory in accordance with the timing signals. These backup aspects are also shown in Japanese patent No. 2-121695 and the Abstract of German Patent No. 29 45 492. These references are also enclosed.

The present invention distinguishes from the cited prior art in an aspect in that a power failure is detected by monitoring the AC line voltage to give the earliest warning of an impending power failure. A supervisory circuit monitors the AC voltage at the secondary of the power supply transformer and signals to the microprocessor of an impending power failure. As the AC voltage drops to a predetermined level, the charge in the filter capacitors supplies the microprocessor circuitry with sufficient power and time to store its operation condition into a backed up memory.

3

Another aspect of the present invention is the implementation of a hardware configured non programmable relay as a part of the automatic control system. The relay operation is determined by a hard wire jumper which acts as a circuit element in the microprocessor circuitry and can be placed or removed to change the relay switching function. One of the applications is to more accurately and effectively control the wash motor reversing function as part of a system to modify preexisting commercial washing machines. In prior art system, there is an unwieldy mechanical timer that controls the direction of the three phase wash motor. While OEM equipment as illustratively shown in U.S. Pat. Nos. 4,452,633 and 5,130,624 indicate controlling the direction of the microprocessor controlled (PSC) reversing motor that runs off a single phase supply and it is widely used in small consumer agitating type washing machines. The present invention shows the use of a jumper to change the switching function of a relay that can be flexibly wired to adapt any three phase motor installation and control the motor direction of rotation. The use of jumpers to change over from one circuit to another is generally shown in U.S. Pat. Nos. 4,467,254 and 4,545,210. While each of these patents discloses the use of a jumper in other types of control circuits, none show the use of a jumper to change the timing characteristics of a relay switching operation to control the automatic reversal of a three phase wash motor direction in a commercial washing machine.

As another aspect of the present invention which is more effective control of the extract motor is achieved by determining the current supplied to the extract motor so as to determine when no more water can be extracted from the wash load.

From the above, it may be seen that the present invention provides for a number of improvements which can be realized with preexisting commercial washing machines so as to enable those who have invested significantly in such machines to continue to use such machines with enhanced and increased efficiency by employing the present invention as set forth in the detailed description hereinafter.

BRIEF DESCRIPTION OF THE DRAWING

FIGS. 8a and 8b are circuit diagrams illustrating the use of the hardware configured relay to control the automatic reversal of the wash motor direction;

FIG. 9 is a block diagram showing the hardware configured relay controlling the motor reverse function;

In the figures numerals as used with certain functions but are related specifically to such functions. Blocks are identified with their functions and numerals are used for such blocks as described below.

DETAILED DESCRIPTION

Figure 1:
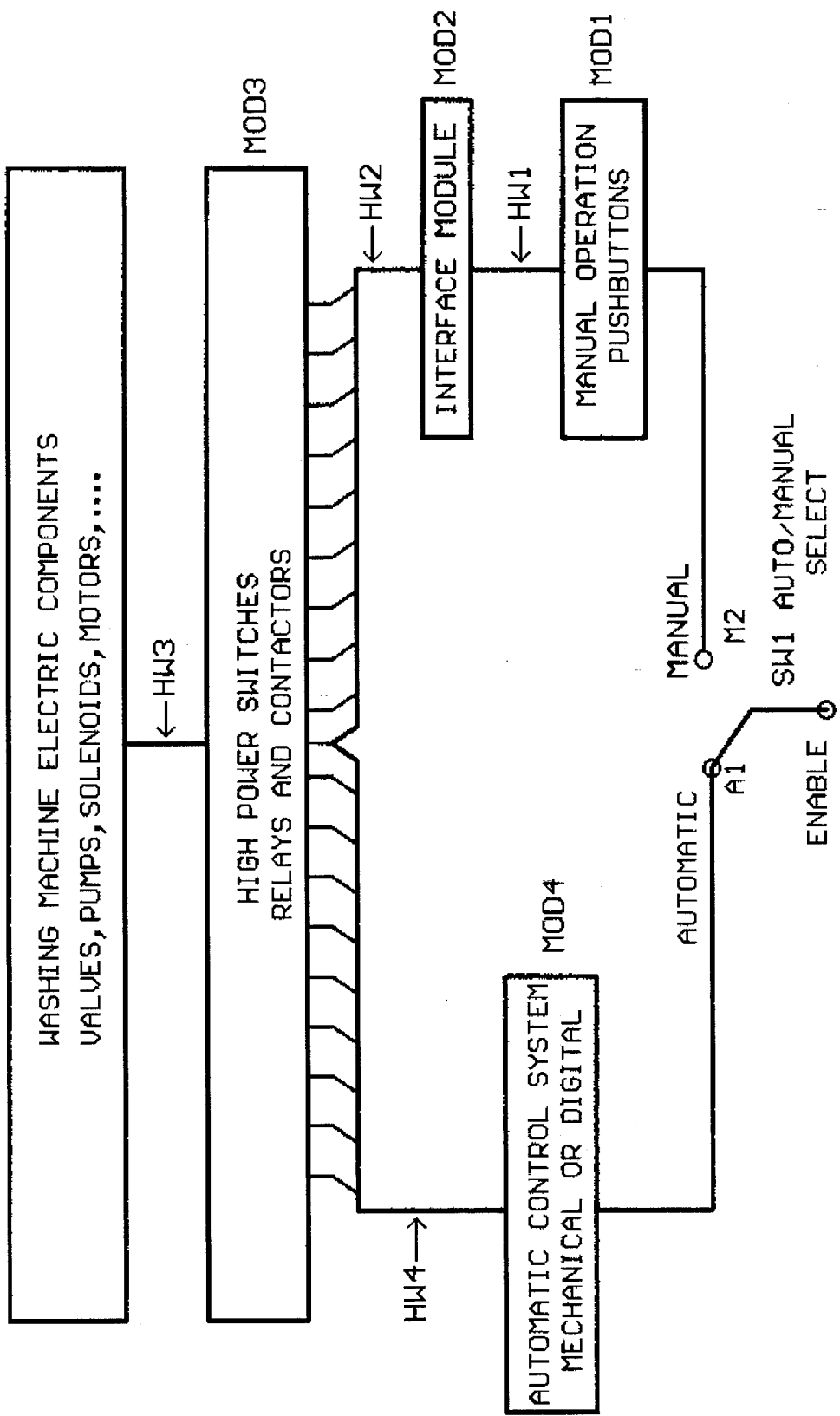
FIG. 1 is a block diagram of a prior art hardwired commercial washing system.

FIG. 1 is a block diagram of a preexisting commercial washing or dry cleaning machine. The machine can operate in an automatic A1 mode or a manual M2 mode as controlled by an auto/manual switch SW1. MOD4 represents an automatic washing machine controller which could be either mechanical or digital. A mechanical controller has a set of mechanically operated switches controlled by a cam shaft driven by a timer motor or other means such a plastic card pulled by gears that are driven by a timer motor.

A digital controller has a set of relays controlled by a microprocessor according to a selected program stored in a memory or a magnetic card. The output of MOD4 is hardwired through harness HW4 to the relays and contactors of (MOD3), the output of which is hardwired through harness HW3 to operate the various washing machine elements.

When operating in the manual mode, there are a plurality of manual operation push buttons MOD1, the outputs of which are connected to an interface module MOD2 through a hardwired harness HW1. The output of interface module MOD2 is hardwired through cable harness HW2 to MOD3. The building of harnesses HW1 and HW2 and their maintenance is to be avoided as an aspect of this invention.

Figure 2:
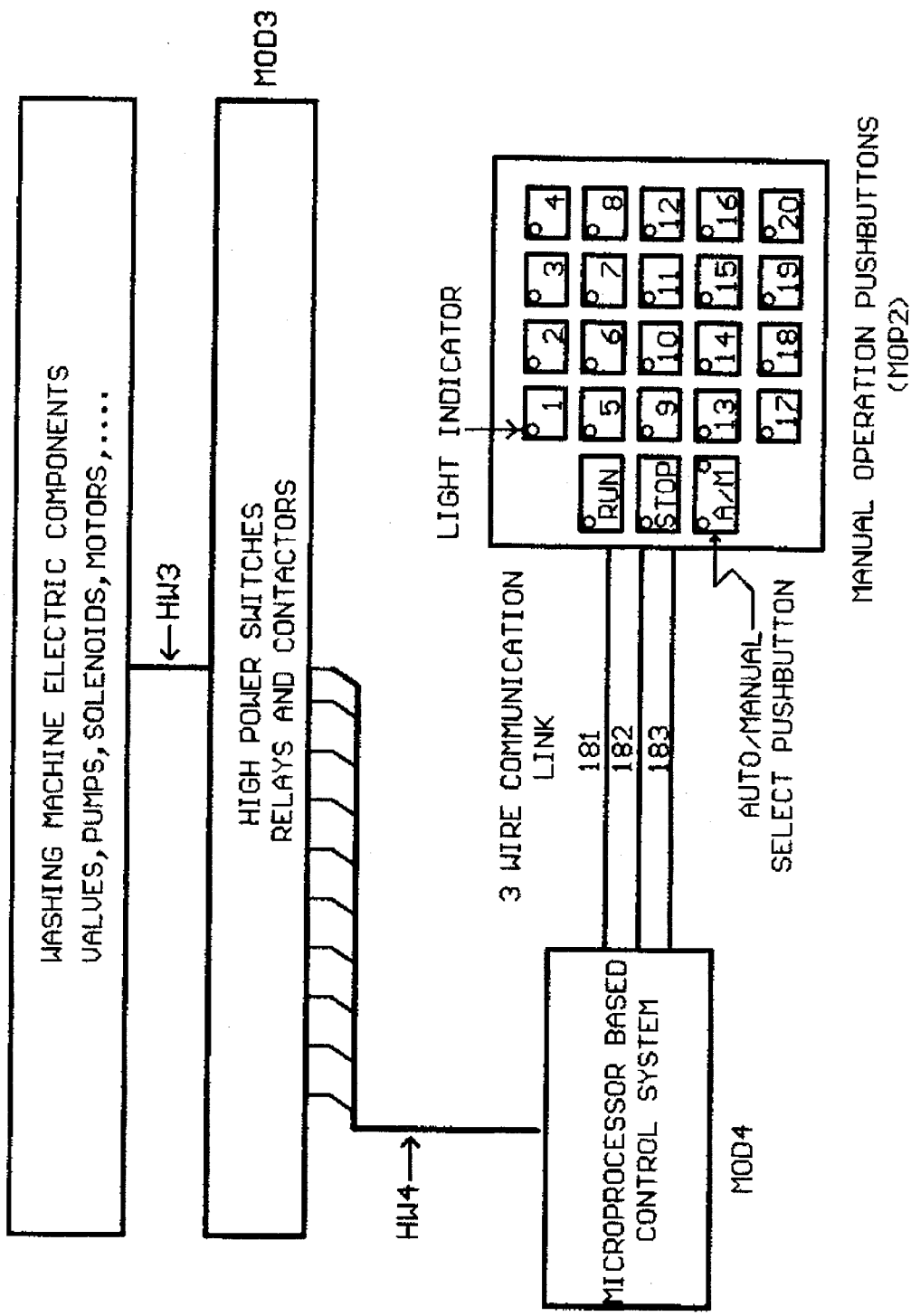
FIG. 2 is a block diagram of an improvement of this invention eliminating some of the undesirable hardwiring of FIG. 1.

FIG. 2 is a block diagram showing an improvement over the prior art. In particular, HW1 and HW2 are eliminated as well as the interface module, and only three lines 181, 182 and 183 are connected between a manual operation push buttons module MOP2 and MOD4. The three line connection 181–183 carries data to control the output relays of MOD4. The output of MOD4 is connected through MOD3 to the elements which control the operation of the system.

Figure 3:
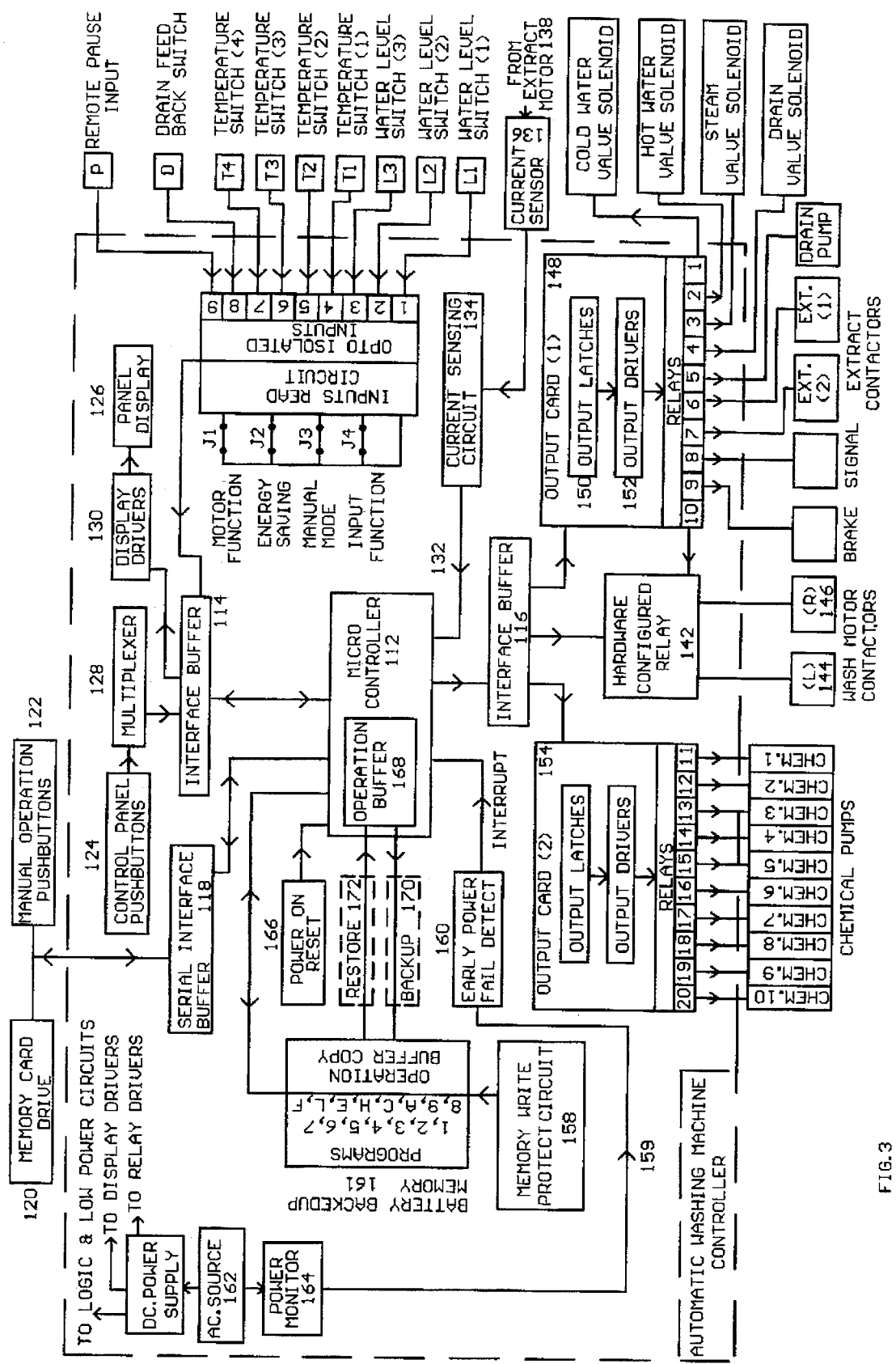
FIG. 3 is a block diagram of the washing machine control system of this invention.

FIG. 3 presents an overall block diagram of the washing machine control of this invention and illustrates a number of functions which are controlled in the commercial washing machine environment. A number of these functions are conventional but the improvement achieved with the present invention is to more effectively control such functions without having to eliminate or discard conventional preexisting large scale commercial washing machines.

An important aspect of this invention is that whereas there is prior art to automate commercial washing machines in which state-of-the-art microprocessors are employed to automatically run the machine, no attention is given to improve the prior art manual operation design technique to make it more simpler and reliable.

In this regard the present invention provides a microcontroller directly controlled by manual push buttons, which microcontroller works with the microprocessor which controls the automatic machine operations, such that the microcontroller controls the microprocessor under control of the manual push buttons. By providing a microcontroller which is compatible with and can control the microprocessor, the unwieldy and bulky harness wiring of the prior art machines is eliminated, even those machines which have been upgraded to be automated with a microprocessor. The terms microcontroller and microprocessor are used substantially interchangeably, but in the present invention there are two such devices, one controlled by the manual push buttons and one controlled either by a selected stored program or by the first microcontroller.

The present invention includes a microcontroller 112 which is the heart of the invention and is connected to interface buffers 114 and 116. An example of a microcontroller used in this invention is Intel 80C31. The microcontroller 112 is also connected to a serial interface 118 which itself is connected to both the memory card drive 120 and manual operation push buttons 122, both of which are external. The memory card drive 120 will be described in more detail hereinafter.

Figure 12:
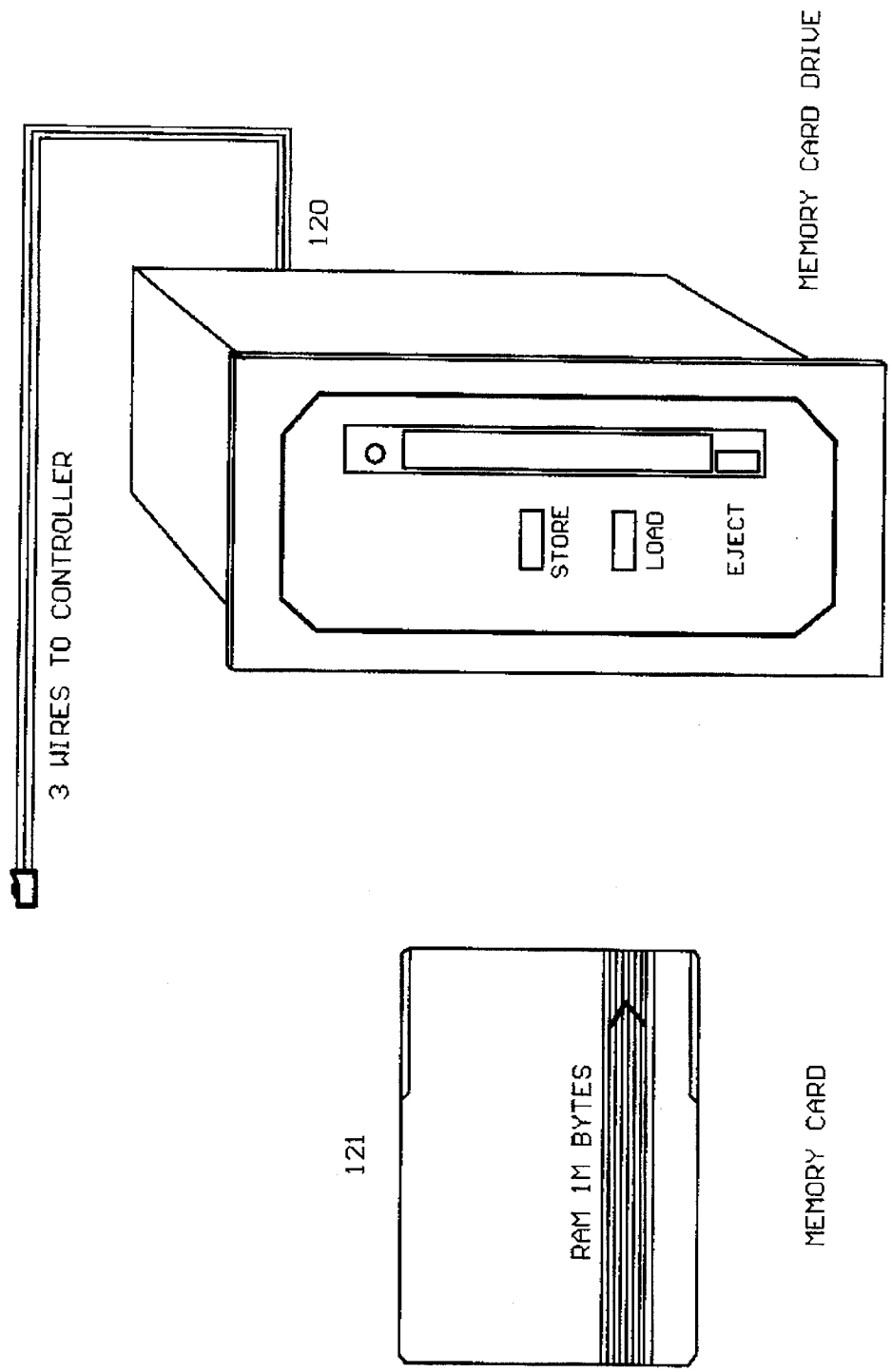
FIG. 12 is a perspective view showing a memory card and a receptacle in which the memory card is inserted to operate the memory card drive.

Interface buffer 114 which is a two way buffer allows the microcontroller 112 to receive operation instructions from the control panel push buttons 124 and also allows the display information to flow from the microcontroller 112 to the display drivers 130 to be displayed on the control panel display 126. Memory card drive 120 (also see FIG. 12) is an input or output device that allows copying of wash programs from memory cards to memory 161 and vice versa.

Hardware jumpers J1 through J4 are utilized for specifically identified functions associated as shown in FIG. 3. In particular, hardware jumper J1 is utilized for controlling motor function, hardware jumper J2 is utilized for the energy saving feature, hardware jumper J3 is used in conjunction with an external switch to disable automatic operation and enables manual operation or vice versa. Hardware jumper J4 is used for certain input functions. The hardware jumpers' information is read by the microcontroller 112 via an interface buffer 114. Washing machine input information such as water levels and temperature are sensed by limit switches connected to optocouplers 1–8 to be read from the inputs read circuitry by the microcontroller 112 via interface buffer 114. Input 9, if energized, will force the automatic wash cycle to stop immediately by signaling the microcontroller 112 to stop which de-energizes all output relays. Operation recommences from where it stopped if input 9 de-energized.

Another input 132 to the microcontroller is supplied by a current sensing circuit 134, the input of which is supplied by a current sensor 136 which senses the current drain of extract motor 138. The operation of this circuit is to determine the most effective time to terminate operation of the extract motor and will be described in more detail hereinafter.

Interface buffer 116 carries relay output information from the microcontroller 112 to output card 148, output card 154, and a hardware configured relay 142. The hardware configured relay 142 is connected to motor contactors 144 and 146 to control the left or right directional movement. Further, the hardware configured relay 142 is connected to a relay 10 located on output card 148. The output card 148 includes output latches 150 connected to a relay driver 152, the output of which is connected to relays 1–10. Each of those relays is connected to control respective functions as indicated: cold and hot water valve solenoids, steam valve solenoid, drain valve solenoid, drain pump, extract 1 and extract 2 contactors, and the signal and brake.

The interface buffer 116 is also connected to a second output card 154 which has another ten relays 11–20, each of which are connected to respective switches to control the chemical formulations to be supplied during the washing functions.

A battery back up memory system 161 is also provided which includes a plurality of programs as listed in the block diagram. A memory write protect circuit 158, to be described in more detail hereinafter is also employed to ensure that if a power failure is detected, the operational status of the machine will be properly stored.

The block diagram for sensing power failure is illustrated as comprising power monitor circuit 164, the output of which receives its input from the AC source 162 which is connected to the early power fail detect circuit which in turn interrupts the microcontroller 112. The interrupt vectors to the backup subroutine 170 forces the microcontroller to make a copy of its operation buffer 168 into the backup RAM 161, and the microcontroller then goes into power down mode (inactive). Upon determining that power has been restored, a power-on reset circuit 166 is energized signaling the microprocessor to resume operation by executing the restore subroutine 172 that copies all operation conditions before the power failure from the backed up RAM 161 into the microcontroller operation buffer 168.

Figure 4:
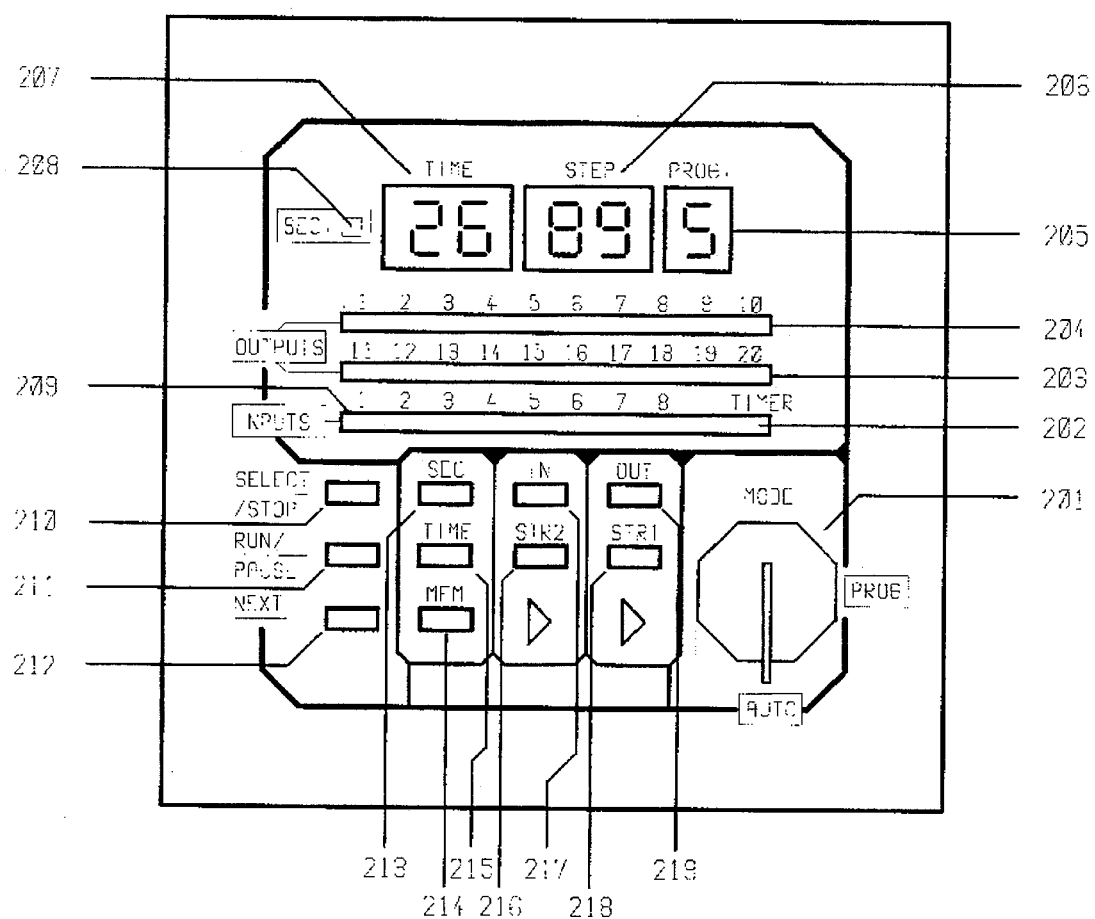
FIG. 4 is a pictorial view of the front plate of the system which incorporates improvements of this invention and presents the user interface therewith.

As identified, the present invention which is illustrated in the block diagram of FIG. 3 is intended to be an aftermarket modification to preexisting commercial washing machines, and the operation of this system will be controlled by a user operating the front plate 200 which is shown in FIG. 4. This is an illustrative front plate and is related to a number of the functions illustrated in the block diagram of FIG. 3. The front plate 200 includes a plurality of operative switches and indicators which carry numerals identified for the specific functions of that plate. Numeral 201 refers to the mode key switch, numeral 202 refers to a timer light indicator, numeral 203 refers to light indicators for outputs 11–20 while numeral 204 refers to light indicators for outputs 1–10. Numerals 205 and 206 relate to the program number display window as well as the step number display window, respectively. Numeral 207 shows the time display window. Numeral 208 displays the seconds indicator light while numeral 209 refers to input 1–8 indicator lights. Numeral 210 is the select/stop push button, numeral 211 is the switch for the run/pause and numeral 212 is the switch to initiate the next step. Numeral 213 is a push button to select the minute or seconds as part of the programming of this system, while numeral 214 illustrates the push button for the memory load. Numerals 215, 216, 217, 218 and 219 are push buttons for the following functions, time set, inputs store, inputs select, outputs store and outputs select respectively. These functions are now described briefly hereinafter.

Mode key switch 201 is a two position key switch in which automatic or program mode can be selected. The timer light indicator 202 blinks on and off every second during the automatic wash cycle. Output light indicators 203 and 204 are related to respective relay outputs which controls respective functions. The program number display window 205 displays the current program number while the step number display window 206 displays the current step of a selected program. The time display window 207 displays the time of the current step in minutes or seconds during the program node. This also displays the time to completion of the total wash program during an automatic wash cycle. The seconds indicator light 208 merely allows the user to determine the time value in seconds when the indicator light is on and the time value in minutes when the time indicator light is off. Individual light indicators 209 (1–8) represent respective inputs of the operation of the system.

The select/stop push button 210 is active to be operated in both the program and automatic mode. The push button allows the user to select between wash programs. While the automatic wash cycle is running, this button 210 will stop the wash cycle, terminate the wash program and reset it to its beginning, and the program display window will display the stop to program number to be rerun or changed.

The run/pause button 211 is active only in the automatic mode and controls the washing machine cycle by executing the selected wash program from the beginning or from where it pauses. If the run/pause button 211 is pressed while the washing machine cycle is running, the wash program will be stopped, halting the operation. All parameters of the operation will be saved when the machine is caused to be in its pause state.

The next step push button 212 advances each existing step by one in the sequence of steps and can advance the operation of the machine accordingly. The minute/second select push button 213 is active only in the program mode and changes the step time setting from minutes to seconds and vice versa. The memory load push button 214 is active only in the program mode and allows the user to review or save the program steps. This may be important in conjunction with the memory card to be employed with the present invention in which it may be desired to save program steps and load them onto a memory card so as to use the same program in different machines without having to reprogram each machine when a preferred operating set of conditions is established. This will be described in more detail hereinafter.

Figure 5:
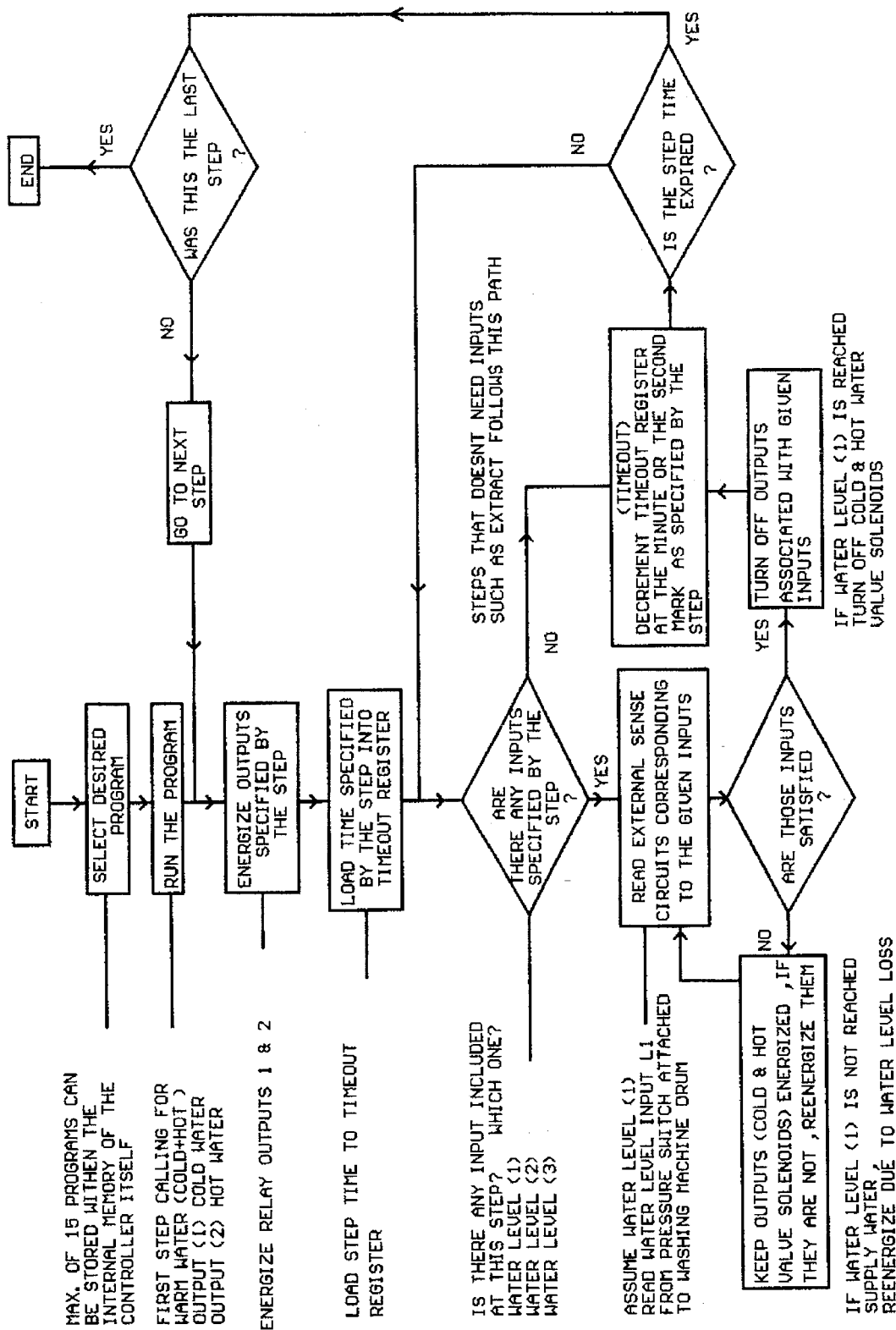
FIG. 5 is a flow chart of an illustrative example of the running of a single step in a washing machine program in accordance with this invention.

The time set push button 215 is active only in the program mode and releases the time shown in the time display window 207 increments by one. The inputs store push button 216 is active only in the program mode and works in conjunction with selected inputs. When more than one input is desired, this button is pressed after each selected input. The inputs selection push button 217 is active only in the program mode and this selects the next input number in sequence. The outputs store push button 218 is active also in the program mode and works in conjunction with desired output operations. The output select push button 219 is also active only in the program mode, and each time this button is pressed, the light indicator moves continuing to the next output number in sequence. When the output indicator light points to the desired output number, the button 219 is energized. FIG. 5 is substantially self-explanatory and is an illustrative flow chart describing a single step in a machine washing program. This is illustrated as one embodiment of the invention, and it is merely to illustrate the operation of the washing machine program. As is understood, the present invention provides for automating and improving existing commercial washing machines by upgrading the operation from the standard control system to an enhanced solid state system in which improved functions are achieved by controlling the operations of various functions and components of the washing machine. FIG. 5 will not be described in more detail and is believed clearly understood by one of ordinary skill in the art as a standard presentation of a flow chart.

Figure 6A:
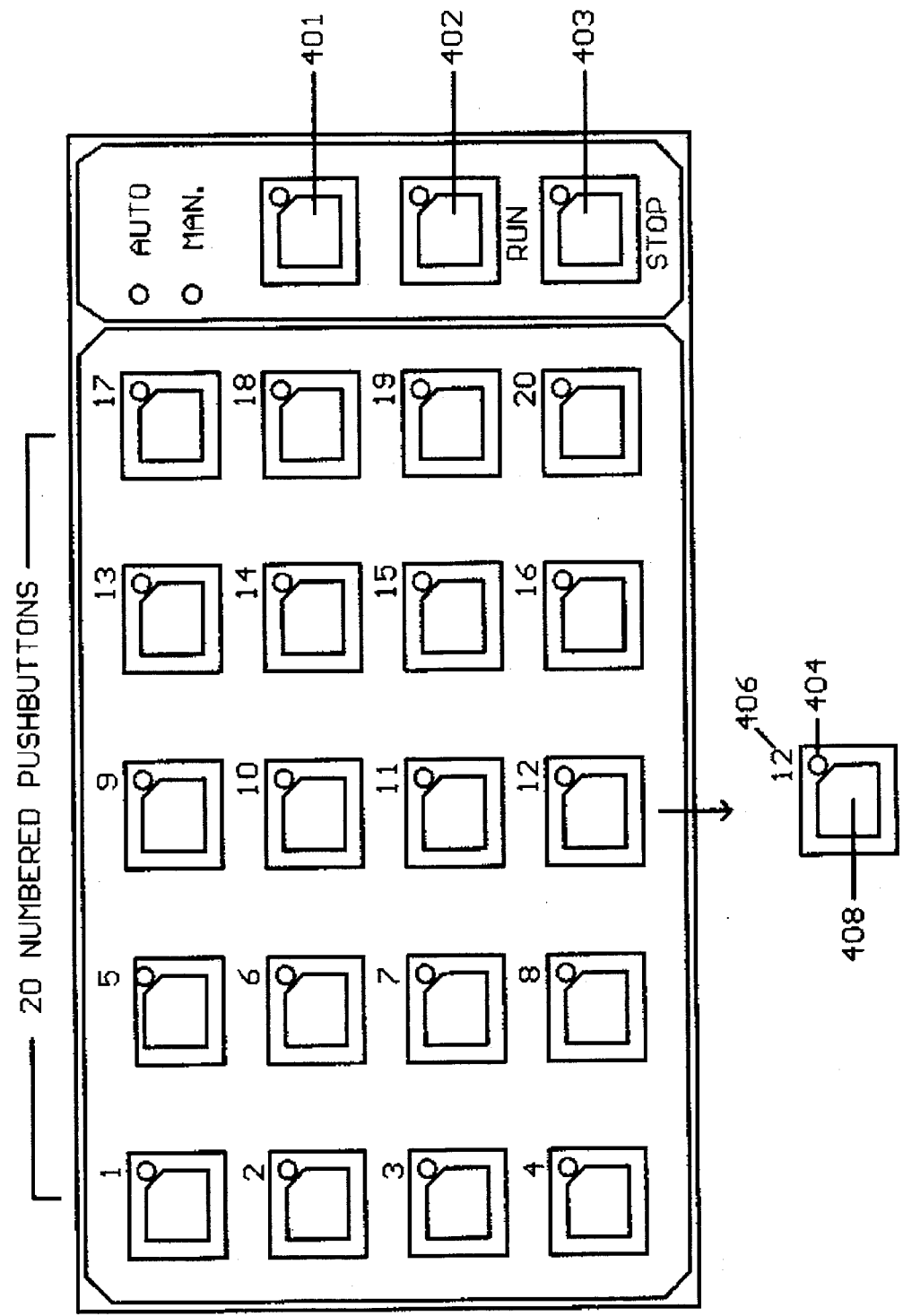
FIG. 6A, B, C is a diagram of the manual operation push button interface of this invention.

FIG. 6a shows a 20 push button manual operation module 122. Each push button 408 has a light indicator 404 that turns on when the push button is pressed. The light indicators are numbered 1–20, each number 406 represents a relay output located at card (1) 148 or card (2) 154 shown in FIG. 3. Card (1) and card (2) are both located inside the washing machine controller. FIG. 6a also includes auto/manual push button 401 that selects automatic or manual operation. Manual operation push buttons are inactive during automatic mode. When the manual mode is selected, a pattern of light indicators can be created by pressing the appropriate push buttons. The relay outputs corresponding to the present light indicator numbers will be energized upon pressing the run push button 402. The stop push button 403 clears the light indicators pattern and terminates the operation of the washing machine by deenergizing all relay outputs.

Figure 6B:
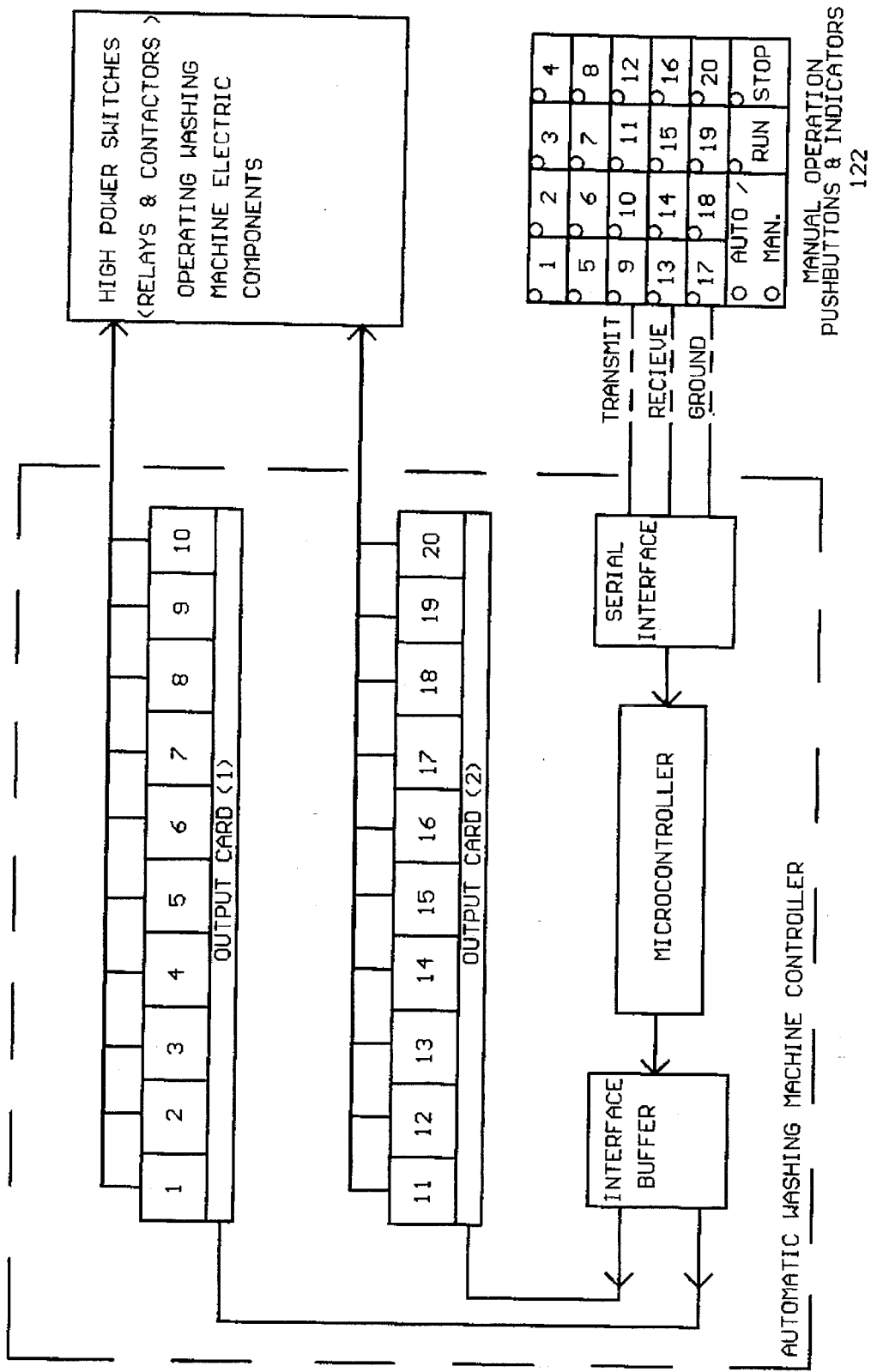

As is understood, commercial washing and dry cleaning machines are designed to run under the control of a stored program or through the operation of the manual push buttons. Any user can manually operate the washing machine step by step by using the push buttons. As stated in the prior art and as understood by the inventor, the push button technology presently available requires built in relay logic, oversized wiring and significant maintenance. The present invention eliminates this by eliminating the need for external logic and lessening the wiring and maintenance thereof. The present invention includes a micro-controller 112 which is described in FIG. 3 and operates in both the auto-function and manual function modes. In the auto-function mode, the microcontroller reads and executes specified wash programs from the internal memory 161 and an example of the running of a step in such a program is illustrated in FIG. 5 above. In the manual mode, the microcontroller reads incoming data from the manual operation push buttons module via only three wires 181–183 as shown in FIGS. 2 and 6b. The microcontroller responds by energizing relay outputs specified by the manual entry. Relay outputs are arranged on card 148 (1) and card 154 (2). The microcontroller does not read from the memory stored program when the manual operation is selected.

Figure 6C:
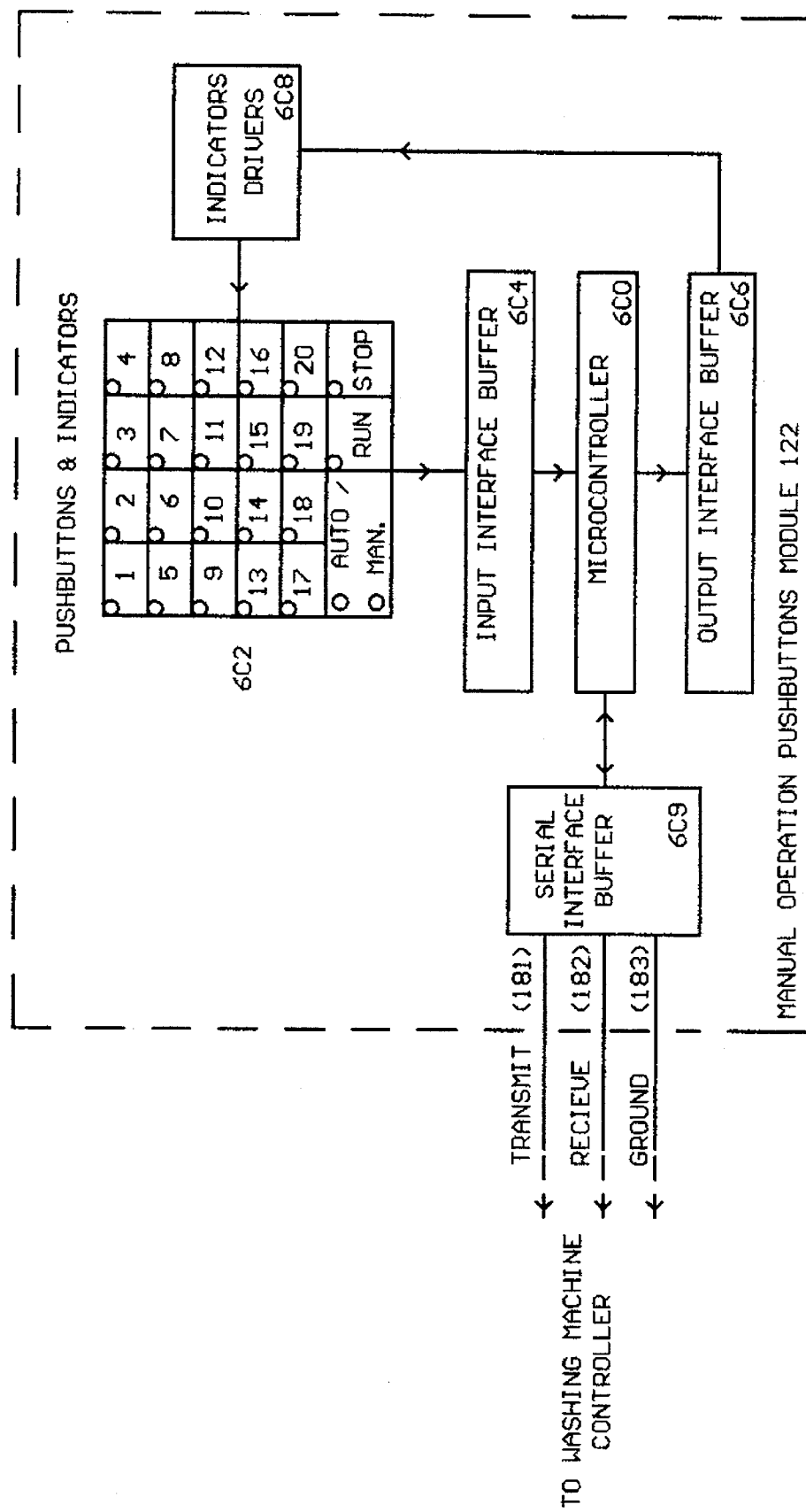

FIG. 6c shows a block diagram for the manual operation push button module. The module has its own microcontroller 6C0. The microcontroller reads incoming data from push buttons 6C2 via input interface buffer 6C4. Light indicators information are sent by the microcontroller 6C0 via output interface buffer 6C6 to Indicator Drivers 6C8. Microcontroller 6C0 communicates with the microcontroller 112 inside the washing machine controller through serial inter/ace 6C9.

Figure 7:
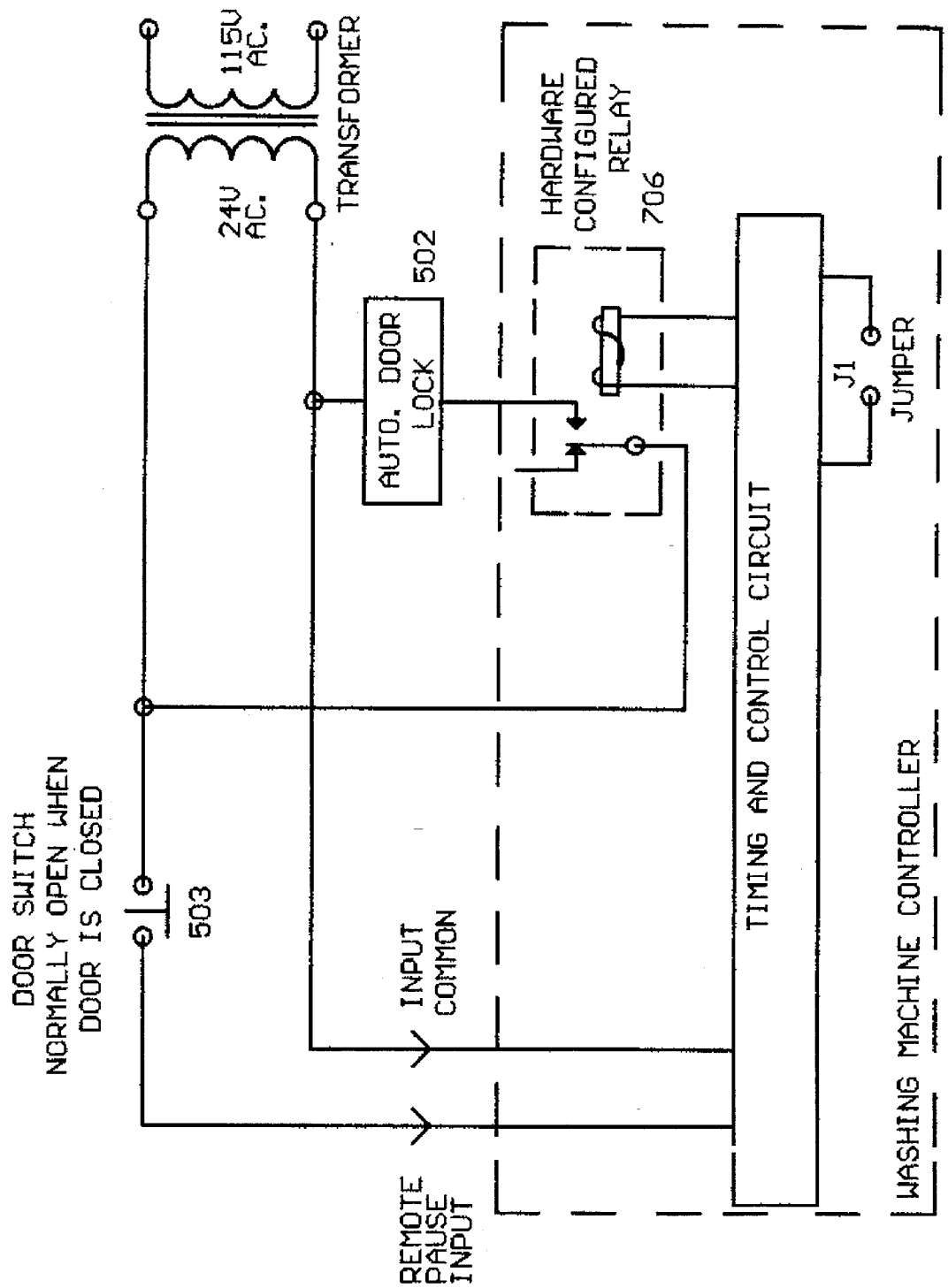
FIG. 7 shows the use of the hardware configured relay to lock the washing machine door.

FIGS. 7–9 relate to the hardware configured relay to work by itself or with a programmable output in conjunction with jumper J1 to be described below.

Jumper J1 may either be connected or disconnected. If Jumper J1 is disconnected (FIG. 7) the hardware configured relay 706 switches to an on position when the wash cycle staffs, and it will switch to an off position when the wash cycle stops. This relay controls an electric load that is required to be energized during a wash cycle and to be turned off when the wash cycle stops. For example, a machine door auto lock 502, as illustrated in FIG. 7 controlled by relay 706 will be energized if jumper J1 is disconnected, the door is closed firmly (door switch 503 is open) and the wash cycle is operative.

If the jumper J1 is connected as illustrated in FIG. 9, the hardware configured relay 706 operates as a two-position switch. One position is wired to the circuit that turns the washer motor to the right 708, while the other is wired to the circuit that turns the washer motor to the left 710. The hardware configured relay works in conjunction with relay 10 (704), and the relay 704 is a programmable relay externally wired as shown, supplying current to the hardware configured relay 706. Should relay 10 (704) not be selected in the user program, the wash motor will not run, and there will be no need to control direction of the motor. If relay 10 (704) is selected in the user program, the motor to run the wash will run and change direction in that time interval set by the program of this invention.

Figure 8B:
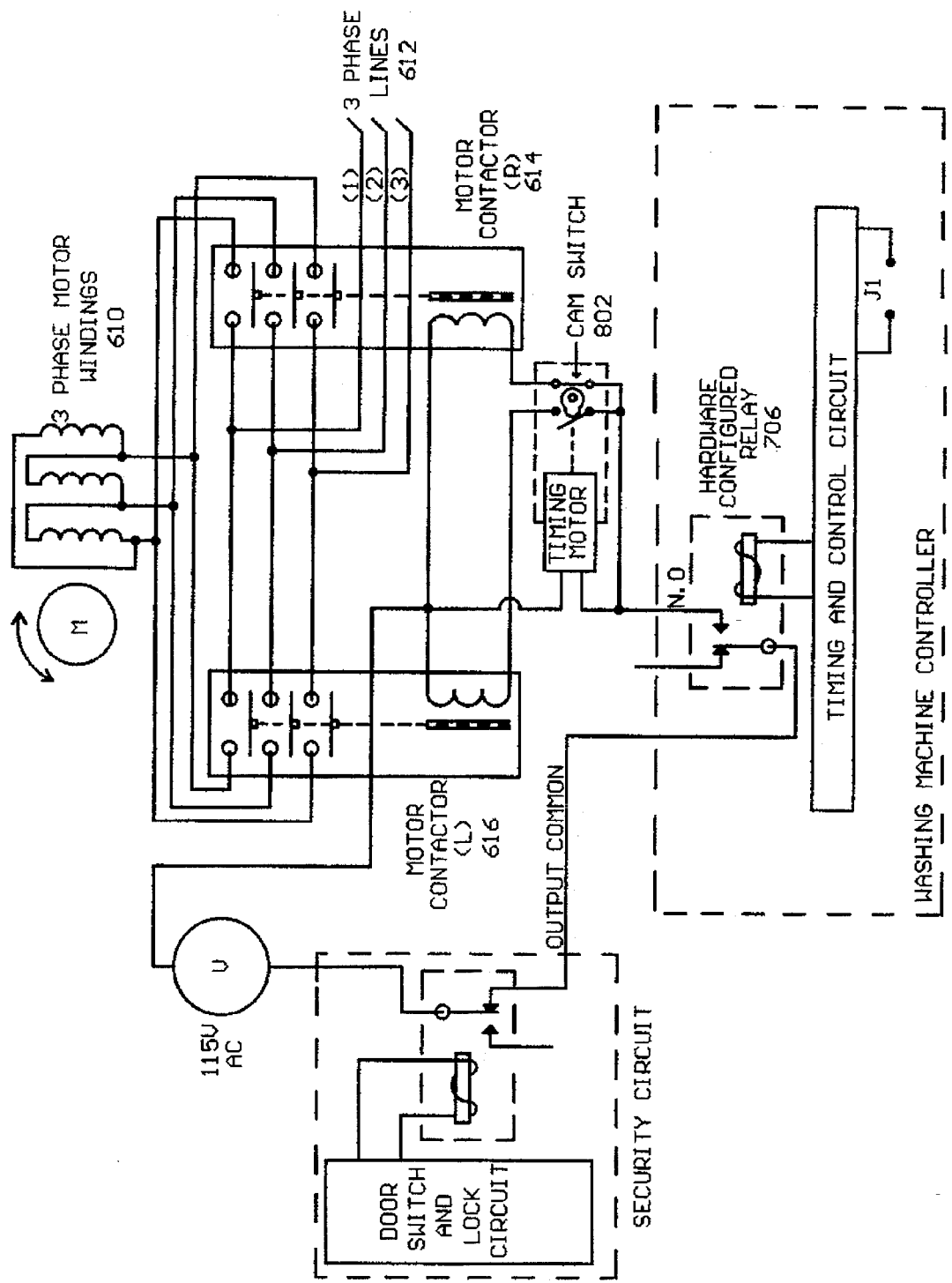

FIG. 8a shows the hardware configured relay 706 controlling the direction of the 3 phase motor 610 by switching power to either contactor 614 or contactor 616. FIG. 8a also shows relay number 10 (704) which is programmable and has been described above with regard to FIG. 9. FIG. 8b shows the hardware configured relay driving a preexisting mechanical timer that controls the reversing function of a 3 phase wash motor. FIG. 8b shows the hardware configured relay 706, mechanical timer (802) and jumper J1 being disconnected.

Figure 11:
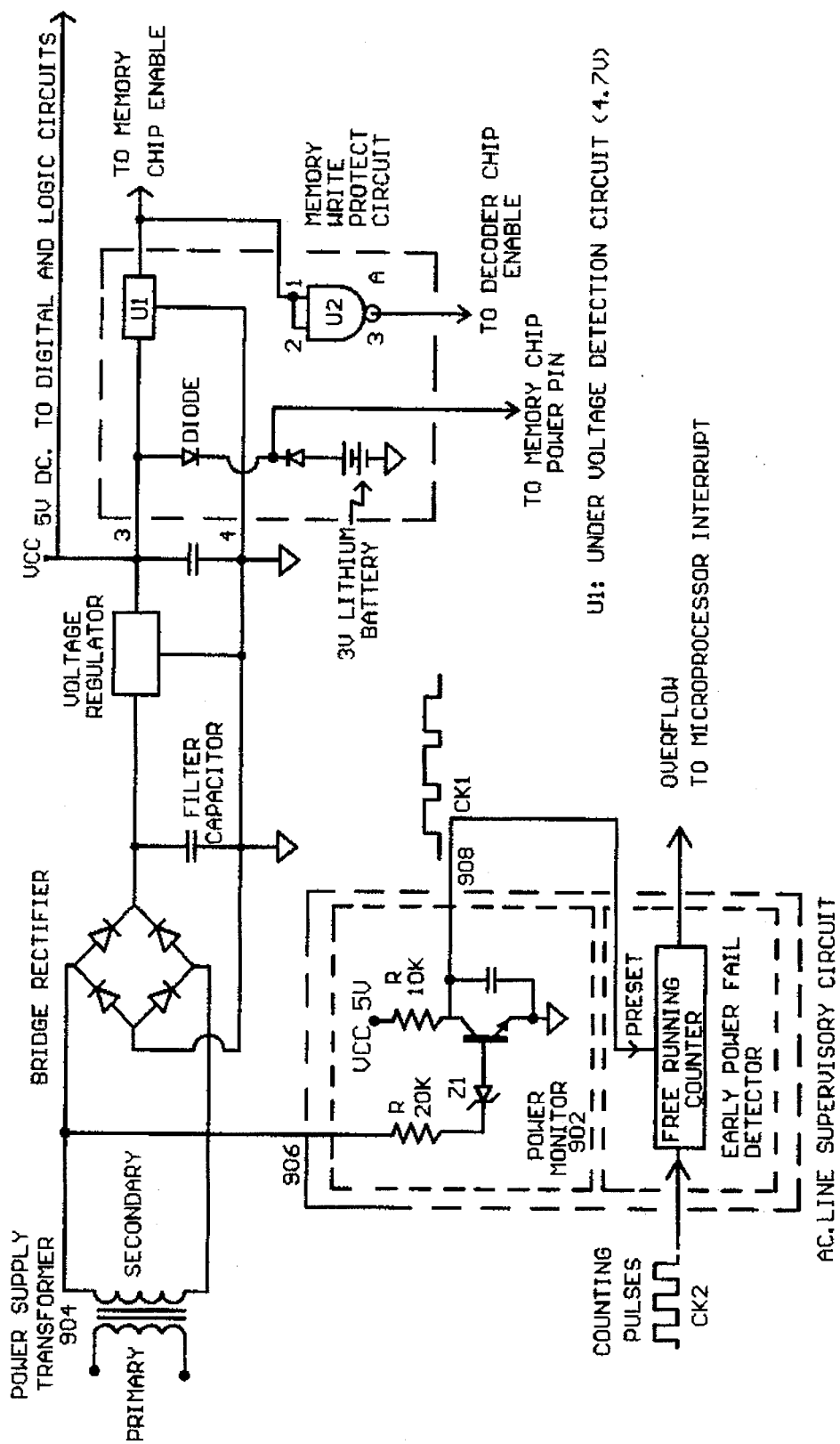
FIG. 11 shows the power monitor and the memory write protect circuits.
Figure 11A:
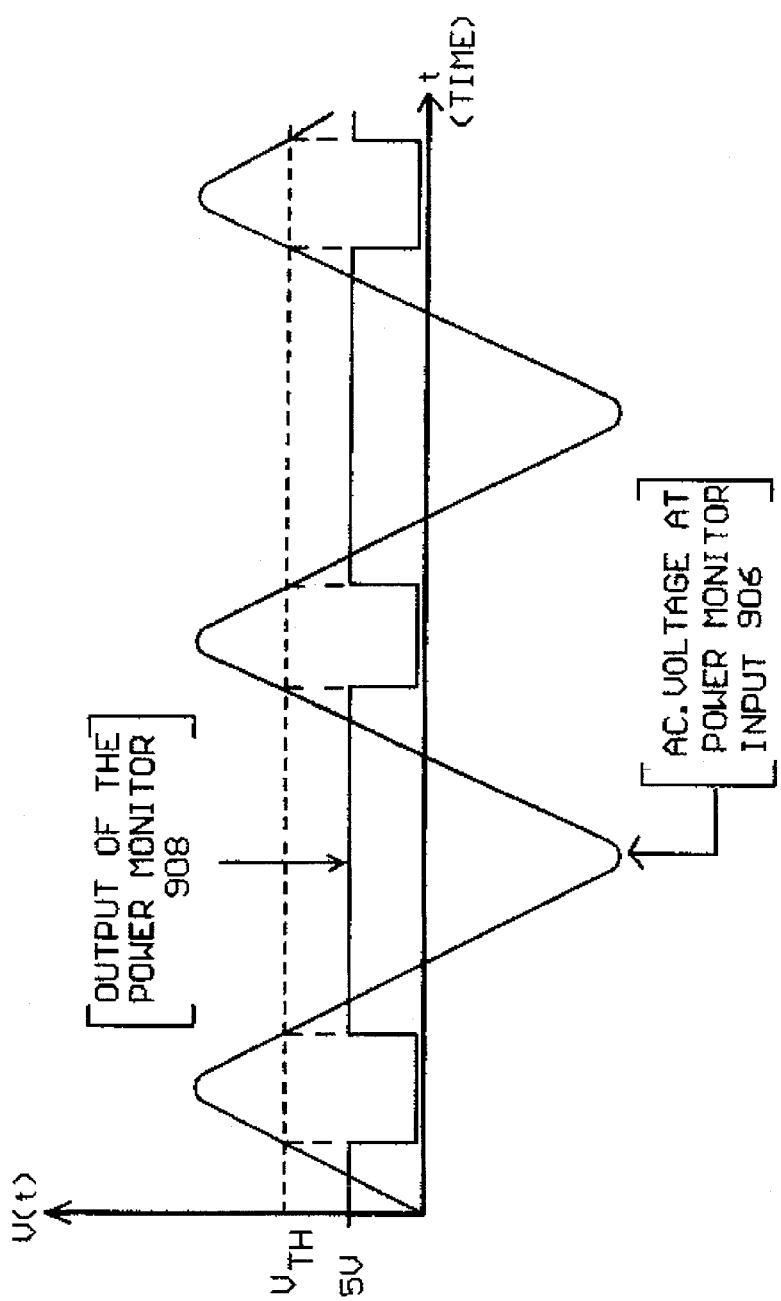

Referring to the processor status restoration. FIG. 11 shows the power monitor circuit 902 with its input connected to the power supply transformer 904. The output of the power monitor 902 goes low then high every cycle of the AC line as long as the peak of the AC voltage positive half cycle at input 906 exceeds the threshold voltage (Vth) set by the Zener diode Z1 (FIG. 11A). The output 908 is connected to the input of the early power fail detector. Power fail detector is a free running counter that increments continuously by the microcontroller oscillator circuitry. When the output 908 of the power monitor goes low, it presets the free running counter to its starting conditions so it will never overflow because it is preset at every cycle of the AC line. If the line voltage does not reach a high enough voltage level to allow power monitor to generate preset pulses, the counter rolls over and overflows. The overflow output interrupts the microcontroller to prepare for an impending power failure. The preset value is determined to allow the counter to overflow in case of absence of three preset pulses which is equivalent to three AC line cycles.

Figure 10:
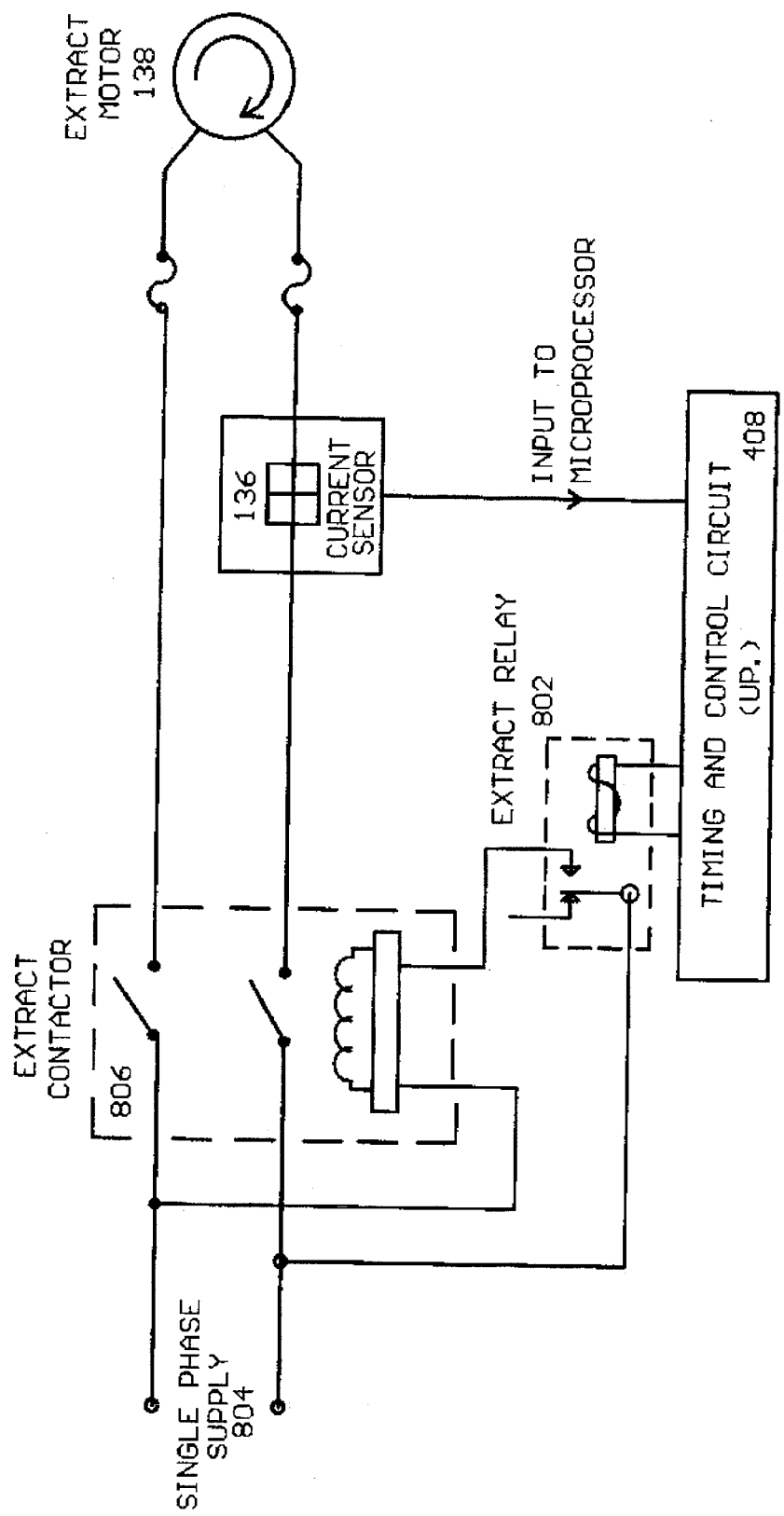
FIG. 10 is a circuit diagram of the extract motor control circuit of this invention.

Once the AC voltage drops, the filter capacitors supply the microcontroller and its circuit with sufficient power and time to store its operation conditions into a battery backed up memory 161. This is illustrated in FIG. 3. When the AC voltage resumes, a power on reset signal 166 is directed to the microcontroller 112 to start the operation. The microcontroller 112 restores its last operating conditions from the backed up memory 161 and resumes operation from where it was stopped at the time of the power interruption. FIG. 10 illustrates another yet another aspect of the present invention in which there is an extract motor control to determine when the extract cycle is terminated. The underlying theory of operation of this circuit is that when water has been completely extracted from the wash load, the load on the extract motor is minimal, so that the current drawn to operate the motor is also minimal. By sensing such a minimal current flow, it would then be determined that no more water can be extracted from the wash load, and that process will be terminated. This process of determining the time to end the extract process is independent of the size of any wash load.

FIG. 10 shows an example of a single phase extract motor 138 that is controlled by timing and control circuit 408 through the extract relay 802. Extract relay 802 energizes contactor 806 which in turn connects the single phase AC supply 804 to the extract motor. This single phase supply is carried through the sensor circuit 136, which is a current sensor to sense the level of current flow in the single phase supply operating the motor. The current passing through the sensors is proportional to the mechanical load to be driven by the extract motor 138. The current sensed decreases so long as the load becomes lighter, and when the load becomes lightest so that the current sense reaches its minimal level and remains there for a predetermined period of time, it will be determined that the extract process has been terminated. At that time, the extract process is terminated, and the next function of the commercial washing cycle is then engaged.

In accordance with yet another feature of this invention, a solid state memory card 121 (FIG. 12) is employed to store multiple wash programs. The memory card is prior art and an example of one such solid state memory card is that identified on page 32 in Personal Computing Tools, of 90 Industrial Park Road, Hingham, Mass., a copy of which is submitted herewith. In accordance with the present invention, the memory card 121 is utilized in a memory card drive 120 as part of the automatic washing machine improved control of the present invention.

The prior art cards utilized with automatic commercial washing machines are either magnetic, plastic or paper punch cards. Each of such cards individually holds individual wash cycle program instructions. The plastic, paper or magnetic cards which are inserted in washer machine control remain there for the washing machine to perform the specified wash cycle. In the present embodiment, all wash cycle programs stored in the automatic washing machine controller which is connected to a memory card drive can be copied onto a semiconductor memory card that is merely inserted into the memory card drive. The memory card is used as a source of backup or to load those programs in other machines. When it is determined that an effective overall series of wash cycle programs or other programs are achieved, the memory card can be used to store such information, and it can be used to load other machines so that all machines can be driven with the most efficient program without having to experiment from machine to machine. In the environment of commercial washing machines, the memory card drive represents a significant improvement regarding maintenance simplicity and safety.

This invention has been described with regard to several improvements all of which together present an improvement for preexisting commercial washing machines. Significant advances are found with the various features of the invention, and the scope of protection of this invention is as set forth in the appended claims.

What is claimed is:

1. A washing/dry cleaning apparatus for automatically controlling a commercial washing/dry cleaning machine, each washing/dry cleaning machine having a wash motor and a plurality of functions associated with the operation of the washing/dry cleaning machine, said plurality of functions are controlled by a plurality of selectively operable relays and contactors, wherein the apparatus comprises:

an automatic machine controlling means for selectively controlling the washing/dry cleaning machine in an automatic mode and a manual mode of operation, said automatic machine controlling means comprising a microcontroller connected to a microprocessor by a serial interfacer the microcontroller provides signals to the plurality of relays and contactors to control the washing/dry cleaning machine in association with the selected mode of operation, said manual mode comprising a manual push button module including a plurality of operator initiated manually activated switches, wherein said plurality of manually activated switches are connected to the microprocessor, said microprocessor decodes the activation of said manually activated switches and supplies compatible control signals along the serial interface to the microcontroller to selectively operate said plurality of relays and contactors, thereby controlling the operation of the washing/dry cleaning machine in the manual mode, said automatic mode controlling the microcontroller through an automatic series of program steps stored into memory to control said plurality of functions associated with the operation of the washing/dry cleaning machine to thereby control the washing/dry cleaning machine by automatically supplying control signals from the microcontroller to the plurality of relays and contactors, thereby controlling the operation of the washing/dry cleaning machine in the automatic mode, wherein said manually activated switches are inactive during said automatic mode, and the microcontroller does not read from the stored memory during the manual mode.

2. The washing/dry cleaning apparatus of claim 1, wherein said serial interface connecting the microcontroller and the microprocessor consists of only three wires.

3. The washing/dry cleaning apparatus of claim 1, wherein said plurality of manually activated switches include associated lighting means to indicate activation of an associated one of said switches.

4. The washing/dry cleaning apparatus of claim 1, further comprising a memory card drive and a solid state memory card insertable therein, said memory card capable of carrying the series of program steps associated with the plurality of functions of the washing/dry cleaning machine, said memory card inserted in and removed from the memory card drive to store said program steps as a back-up or to load said program steps into another washing/dry cleaning apparatus.

5. The washing/dry cleaning apparatus of claim 1, further comprising a hardware configured relay operable in a first state to control electromechanically coupled operations associated with the washing machine function, and operable in a second state, in association with a specified programmable relay, to control the direction of rotation of the wash motor, and a jumper connected in said automatic machine controlling means to determine if the hardware configured relay is operating in the first or second state.

6. The washing/dry cleaning apparatus of claim 5, wherein said jumper is controlled by an external element inserted in the washing/dry cleaning apparatus.

7. The washing/dry cleaning apparatus of claim 1, further comprising a control circuit to control the extract motor during an extraction cycle of a wash load in the washing/dry cleaning machine, said control circuit utilizing a current sensor to measure a current supplied to the windings of the extract motor during the extract cycle, said current being proportional to the weight of the wash load, said control circuit determining when the current from the current sensor is at a minimum level for a set period of time at which time the extract cycle is terminated.

8. The washing/dry cleaning apparatus of claim 1, further comprising a power monitor circuit to determine when an AC voltage level drops below a preset voltage level.

9. The washing/dry cleaning apparatus of claim 8, further comprising an early power fail detect circuit connected to said power monitor circuit to signal the microcontroller when the AC voltage level drops below said preset level for predetermined period of time, capacitance means coupled to said microcontroller to provide sufficient power to store the status of the program being run at the time of the detection of the drop of AC voltage for said predetermined period of time.

* * * * *